US010316439B2

(12) United States Patent
Date et al.

(10) Patent No.: US 10,316,439 B2
(45) Date of Patent: Jun. 11, 2019

(54) CRIMPED POLYAMIDE YARN, AND WOVEN OR KNIT FABRIC EMPLOYING SAME

(71) Applicant: TORAY INDUSTRIES, INC., Tokyo (JP)

(72) Inventors: Hiroaki Date, Otsu (JP); Yasuhiro Shibata, Osaka (JP); Yosuke Matsuki, Otsu (JP); Hongchuan Jing, Otsu (JP)

(73) Assignee: TORAY INDUSTRIES, INC., Tokyo (JP)

(*) Notice: Subject to any disclaimer, the term of this patent is extended or adjusted under 35 U.S.C. 154(b) by 147 days.

(21) Appl. No.: 15/118,294

(22) PCT Filed: Feb. 25, 2015

(86) PCT No.: PCT/JP2015/055367
§ 371 (c)(1),
(2) Date: Aug. 11, 2016

(87) PCT Pub. No.: WO2015/129735
PCT Pub. Date: Sep. 3, 2015

(65) Prior Publication Data
US 2017/0167061 A1 Jun. 15, 2017

(30) Foreign Application Priority Data
Feb. 26, 2014 (JP) ................. 2014-035053

(51) Int. Cl.
B32B 5/02 (2006.01)
D01D 5/32 (2006.01)
D01F 8/12 (2006.01)
D02G 1/02 (2006.01)
D02G 3/04 (2006.01)
D06N 3/00 (2006.01)
D03D 15/08 (2006.01)

(52) U.S. Cl.
CPC ............. D03D 15/08 (2013.01); B32B 5/024 (2013.01); D01D 5/32 (2013.01); D01F 8/12 (2013.01); D02G 1/0206 (2013.01); D02G 1/0286 (2013.01); D02G 3/045 (2013.01); D06N 3/0006 (2013.01); B32B 2262/0261 (2013.01); B32B 2262/12 (2013.01); B32B 2307/51 (2013.01); B32B 2437/00 (2013.01); D06N 2201/0263 (2013.01); D06N 2211/10 (2013.01); D10B 2331/02 (2013.01); D10B 2501/00 (2013.01)

(58) Field of Classification Search
CPC ...... D03D 15/08; D02G 1/0286; D02G 3/045; D02G 1/0206; B32B 5/024; B32B 2307/51; B32B 2262/0261; B32B 2262/12; B32B 2307/57; B32B 5/04; D06N 3/0006; D06N 2201/0263; D01D 5/32; D01F 8/12; D10B 2331/02; D10B 2501/00
USPC .......................................... 428/384
See application file for complete search history.

(56) References Cited

U.S. PATENT DOCUMENTS 5,621,937 A * 4/1997 Georgantas .............. D06B 3/28
68/177
5,874,372 A * 2/1999 Morishita .............. D03D 15/08
139/421

FOREIGN PATENT DOCUMENTS

| JP | 41-1305 | B1 | | 2/1966 | |
|---|---|---|---|---|---|
| JP | 2-26932 | A | | 1/1990 | |
| JP | H0226932 | A | * | 1/1990 | ........... D01G 1/0286 |
| JP | H09228218 | A | * | 9/1997 | ............... D04H 1/54 |
| JP | 2001-159030 | A | | 6/2001 | |
| JP | 2001159030 | A | * | 6/2001 | |

OTHER PUBLICATIONS

Study on tensile properties of coated fabrics and laminates, V. Masteikaite et al.; Indian Journal of Fibre & Textile Research vol. 30, Sep. 2005, pp. 267-272.*
Machine translation of JP2001159030A Feb. 2018.*
Machine translation of JPH0226932A Feb. 2018.*
International Search Report for PCT/JP2015/055367 dated May 26, 2015.
Written Opinion of the International Searching Authority for PCT/JP2015/055367 (PCT/ISA/237) dated May 26, 2015.

* cited by examiner

Primary Examiner — Camie S Thompson
(74) Attorney, Agent, or Firm — Birch, Stewart, Kolasch & Birch LLP

(57) ABSTRACT

The present invention provides a crimped polyamide yarn to which it is possible, using fibers that include low water absorption polyamide, to impart a stretch property and pliability such that it is possible for the inherent stretch properties of the crimped yarn to be appropriately expressed in a woven or knit fabric. The crimped polyamide yarn of the present invention is a side-by-side composite yarn which includes at least 40 mass % of low water absorption polyamide having an average of water absorption ratio of 5% or less at a temperature of 30° C. and a relative humidity (RH) of 90%, and in which the low water absorption polyamide is at least one component. The yarn is false-twisted, and has a crimp elongation ratio of 25% or more.

15 Claims, No Drawings

CRIMPED POLYAMIDE YARN, AND WOVEN OR KNIT FABRIC EMPLOYING SAME

TECHNICAL FIELD

The present invention relates to a crimped polyamide yarn constituted by fibers at least partially including low water absorption polyamide, the crimped polyamide yarn providing a woven or knit fabric for a product with a good product quality that is free from wrinkles or embossment and has a high stretch property even after a dyeing process.

BACKGROUND ART

Conventionally, polyamide fibers are softer and have better touch feeling compared with polyester, and thus are widely used for clothing. A single yarn composed of a single polymer, such as nylon 6 or nylon 66 which is typical polyamide fiber for clothing, has almost no stretch property therein. Therefore, such a single yarn is imparted with a stretch property by, for example, performing false-twisting, and is used for woven or knit fabrics having stretch properties. However, it has been difficult to obtain a woven or knit fabric that has a sufficiently satisfying stretch property from such single yarns that are false-twisted or the like.

For above reasons, a method for obtaining a woven or knit fabric having a stretch property by using elastic fibers or by using two or more polymers with different properties together to form a composite fiber having latent crimp performance has been proposed (see Patent Document 1), the latent crimp performance developing a crimp by heat treatment such as dyeing.

As the elastic fibers, which are the former, polyurethane-based elastic yarns are often used. However, polyurethane-based elastic yarns are typically covered by threads composed of nylon 6 or nylon 66 for use because polyurethane-based elastic yarns have problems in dyeability and light resistance. This still leaves problems such as increase in the mass of the product, increase in costs for the covering process and costs for the polyurethane-based elastic yarn product, and heaviness of the weight of the fabric.

As another example of stretch fibers, composite fibers in which nylon-based elastomer and polyamide are put together in side-by-side arrangement or in eccentric core-sheath arrangement are proposed (see Patent Document 2). This proposal has a problem that the stretch property is lost in processes such as a purification process and a dyeing process due to the characteristic swelling property of polyamide and thus the products do not have sufficient stretch.

Further, even in the case where such polyamide fibers are excellent in crimp properties and exhibit good stretch in a state of an original yarn or a processed yarn, the woven or knit fabric requires to be processed with a tensile force applied thereto in a wet-heat process in order to keep the quality of the woven or knit fabric. This is because generation of wrinkles particular to polyamide fibers is likely to occur in wet-heat processes such as purification and dyeing processes of the woven or knit fabric and the wrinkles generated in the wet-heat processes are not likely to be removed in a dry-heat process of a heat setting process. As described above, there is a problem that the crimp that the original yarn or processed yarn has cannot be sufficiently developed due to the tensile force applied to the woven or knit fabric in the wet-heat process, and as a result the woven or knit fabric has a poor stretch property.

Patent Document 3 proposes a material of latent crimp polyamide that is good in warp stretch and recovery property in a woven fabric. However, polyamide tends to swell with water included therein, is likely to have wrinkles or embossment generated therein in a process of purification, relaxation, or dyeing, and reduces stretch thereof because polyamide is generally processed while being extended. Although a relatively high stretch can be achieved if the tensile force in the processing is reduced in order to improve stretch, it is difficult to improve the quality in terms of wrinkles or embossment.

PRIOR ART DOCUMENT

Patent Documents

Patent Document 1: Japanese Patent Laid-open Publication No. 2000-27031
Patent Document 2: Japanese Patent Laid-open Publication No. 57-193521
Patent Document 3: Japanese Patent Laid-open Publication No. 2003-129352

SUMMARY OF THE INVENTION

Problems to be Solved by the Invention

For above reasons, the present invention aims to solve the problems described above, and an object of the present invention lies in providing a woven or knit fabric with a good quality and a high stretch by using a crimped polyamide yarn to which it is possible, using fibers that include low water absorption polyamide, to impart a stretch property and pliability such that it is possible for the inherent stretch properties of the crimped yarn to be sufficiently expressed in a woven or knit fabric. By taking a different technical approach, the present invention achieves solving problems that have not been solved.

Solutions to the Problems

The present inventors have studied to solve the problems described above and, as a result, reached the present invention. That is, the crimped polyamide yarn of the present invention is a high-stretch crimped polyamide yarn constituted by fiber that includes at least 40 mass % of low water absorption polyamide having an average of water absorption ratio of 5% or less at a temperature of 30° C. and a relative humidity of 90% RH, and has a stretch elongation ratio of 100% or more.

The crimped polyamide yarn of the present invention is also a crimped polyamide yarn constituted by fiber that includes at least 40 mass % of low water absorption polyamide having an average of water absorption ratio of 5% or less at a temperature of 30° C. and a relative humidity of 90% RH, and has a crimp elongation ratio of 25% or more.

According to a preferable embodiment of the crimped polyamide yarn of the present invention, the low water absorption polyamide is composed of a fiber that at least partially includes nylon 610 or a copolymer thereof.

According to a preferable embodiment of the crimped polyester yarn of the present invention, the fiber has a crimp retention ratio at wet-heat of 30% or more, a crimp retention ratio at dry heat of 50% or more, and a rate of crimp retention ratio represented by crimp retention ratio at dry heat/crimped retention ratio at wet-heat of 1.0 or more and 1.7 or less.

According to a preferable embodiment of the crimped polyamide yarn of the present invention, the fiber is a fiber in which two kinds of polyamide having a viscosity difference of 0.03 or more and 0.15 or less are stuck together side by side.

In the present invention, it is possible to weave or knit a woven or knit fabric at least partially including the crimped polyamide yarn, and the woven or knit fabric is purified and dyed through liquid jet processing.

The woven or knit fabric obtained from the crimped polyamide yarn of the present invention is a high-elongation woven polyamide fabric that includes at least 40 mass % or more of low water absorption polyamide having an average of water absorption ratio of 5% or less at a temperature of 30° C. and a relative humidity of 90% RH, includes a false-twisted yarn of a side-by-side composite yarn including the low water absorption polyamide as one component, exhibits an elongation ratio of 20% or more with a load of 14.7 N/5 cm in a warp direction of the woven polyamide fabric, and has an elongation recovery ratio of 80% or more in the warp direction of the woven polyamide fabric.

According to a preferable embodiment of the high-elongation woven polyamide fabric of the present invention, the high-elongation woven polyamide fabric is subjected to laminate processing or coating processing.

According to a preferable embodiment of the high-elongation woven polyamide fabric of the present invention, the high-elongation woven polyamide fabric at least partially includes, as the low water absorption polyamide, a side-by-side composite yarn including nylon 610 or a copolymer thereof as one component.

According to a preferable embodiment of the woven or knit fabric of the present invention, the elongation ratio is 20% or more with a load of 14.7 N/5 cm in a weft direction of the woven polyamide fabric.

Effects of the Invention

According to the present invention, a crimped polyamide yarn to which it is possible, using fibers that include low water absorption polyamide, to impart a stretch property and pliability such that it is possible for the inherent stretch properties of the crimped yarn to be sufficiently expressed in a woven or knit fabric is obtained. Particularly, using the crimped polyamide yarn of the present invention, it is possible to obtain a woven or knit fabric that has a high stretch property in a warp direction that has been difficult for conventional woven polyamide fabrics.

EMBODIMENTS OF THE INVENTION

Next, the crimped polyamide yarn of the present invention will be described in detail. The crimped polyamide yarn of the present invention is a crimped polyamide yarn constituted by fiber that includes at least 40 mass % of low water absorption polyamide having an average of water absorption ratio of 5% or less at a temperature of 30° C. and a relative humidity of 90% RH, and has a stretch elongation ratio of 100% or more.

For the crimped polyamide yarn of the present invention, it is required that fibers including at least 40 mass % of low water absorption polyamide having an average of water absorption ratio of 5% or less at a temperature of 30° C. and a relative humidity of 90% RH with a treatment time of 24 hours are used. This is because, by using fibers including 40 mass % or more of low water absorption polyamide having an average of water absorption ratio of 5% or less, swelling under wet-heat conditions such as a purification process and a dyeing process and elongation ratio of a woven or knit fabric in these processes are reduced, and thus it becomes possible to perform processes such as the purification process and the dyeing process without applying an excessive tensile force to the woven or knit fabric.

Fibers including less than 40 mass % of low water absorption polyamide causes a great degree of swelling of a thread or a woven or knit fabric and quality degradation of a woven or knit fabric such as processing malfunction or wrinkles due to slackening in processes such as a purification process and a dyeing process. Therefore, these processes require to be performed with a strong tensile force. As a result, the crimp developed due to heat reduces greatly and the product (woven or knit fabric) becomes low in stretch. Fibers including low water absorption polyamide may be used for part of the crimped yarn or in the amount of 100 mass %. In addition, whereas fibers including low water absorption polyamide having an average of water absorption ratio of 5% or less are used for the present invention, swelling in a purification or dyeing process becomes greater and the stretch product (woven or knit fabric) described above will be no longer obtained when the average of water absorption ratio is more than 5%.

The lower limit value of the average of water absorption ratio may be about 0.4%, which is about that of usual polyester, since slackening does not occur in the purification process, the dyeing process, or the like when it is about that of general polyester.

The stretch elongation ratio of the crimped polyamide yarn of the present invention is 100% or more. If the stretch elongation ratio is less than 100%, sufficient stretch cannot be achieved in the product (woven or knit fabric). Although it is preferable to use a high crimped yarn to develop stretch, substantially, when it is attempted to obtain a crimped yarn having a stretch elongation ratio of 400% or more, which is a value applicable to a crimped yarn, passability of the yarn in a yarn-making process or false-twisting process reduces, and the quality of the product may be unstable. Therefore, the preferable range of the stretch elongation ratio is 150% or more and 400% or less.

Here, the stretch elongation ratio is a method for measuring the elongation of a crimped yarn whose value greatly varies depending on treatment conditions. In the present invention, it is used as one of the methods to estimate the stretch of the product after being processed. Therefore, wet-heat treatment with application of a load assumed in a cloth (woven or knit fabric) structure is used as the treatment conditions for the stretch elongation ratio. The detail of the measurement method will be described later.

Methods for obtaining a crimped yarn having a stretch elongation ratio of 100% or more include a method in which polymers varying in viscosity or contraction are used in combination for a side-by-side composite yarn and applying processing that imparts a strong crimp to fibers after spinning to obtain a high crimped yarn, and it is effective to use these two methods together. However, fibers in a side-by-side composite yarn takes a spiral crimped shape when crimp is developed, and thus a stretch effect may not be developed due to false-twisting. It is preferable to adjust the twist multiplier of the false-twisting to 20,000 or more and 35,000 or less in order to develop this crimp effectively.

In addition, it is important for the crimped yarn to have a crimp elongation ratio of 25% or more. In the case of a crimped yarn for a product of a woven or knit fabric, the state of the crimped yarn including reduction of the crimp in the process of weaving, knitting, or dyeing is evaluated by evaluating a yarn pulled out from the product of the woven or knit fabric. The stretch elongation ratio described above is an index for evaluating the potential of the crimped yarn as a yarn, and, as described above, polyamide is generally processed with a relatively large tensile force applied thereto, for its characteristic swelling, in a dyeing process after weaving or knitting in consideration of the quality concerning wrinkles or the like and process passability. With such a large tensile force, development of the crimp of the crimped polyamide yarn of the present invention in a woven or knit structure is suppressed and high elongation for which the yarn has been designed becomes difficult to achieve. By using the crimped polyamide yarn of the present invention, as described above, quality degradation such as wrinkles, which is likely to occur for polyamide, or deterioration of process passability becomes less likely to occur. Therefore, by employing an appropriate method of a dyeing process, such as appropriately controlling the processing tensile force in processing, it becomes possible to develop a sufficient crimp in the crimped polyamide yarn of the present invention in the structure of the woven or knit fabric product after the dyeing process and achieve a high elongation property of the woven or knit fabric. To achieve a high elongation property, it is important that the crimped yarn pulled out from the woven or knit fabric product keeps a high crimp, that is, a crimp elongation ratio of 25% or more.

Preferable examples of the low water absorption polyamide used for at least part of the fibers constituting the crimped polyamide yarn of the present invention include nylon 210, nylon 310, nylon 410, nylon 510, nylon 610, nylon 710, nylon 810, nylon 910, nylon 1010, nylon 1110, and nylon 1210, which are obtained from the combination of dicarboxylic acid units and diamine units, the dicarboxylic acid units including sebacic acid units as main components. Among these, nylon 410, nylon 510, nylon 610, nylon 710, nylon 810, nylon 910, nylon 1010, nylon 1110, and nylon 1210 are more preferable. Among these, nylon 610, which is stable in polymerization property, causes less yellowing of the crimped yarn, and has a good dyeability, is most preferably used.

Here, sebacic acid can be manufactured by, for example, refining castor oil obtained from seeds, and is positioned as a plant-derived raw material. Examples of dicarboxylic acid constituting other dicarboxylic acid units than sebacic acid units include oxalic acid, malonic acid, succinic acid, glutaric acid, adipic acid, pimelic acid, suberic acid, azelaic acid, phthalic acid, isophthalic acid, and terephthalic acid, and these may be formulated as long as the advantageous effect of the present invention is not impaired. These dicarboxylic acids are also preferably derived from plants. The copolymerization amount of the other dicarboxylic acid units than the sebacic acid units described above is preferably 0 to 40 mol % or less, more preferably 0 to 20 mol %, and furthermore preferably 0 to 10 mol % with respect to all the dicarboxylic acid units. Examples of diamines constituting the diamine units include diamines having 2 or more carbon atoms, and diamines having 4 to 12 carbon atoms are preferable. Specifically, examples thereof include putrescine, 1,5-pentanediamine, hexamethylenediamine, trimethylenediamine, nonanediamine, methylpentanediamine, phenylenediamine, and ethambutol. These diamines are also preferably derived from plants.

The fibers constituting the crimped polyamide yarn of the present invention preferably have a crimp retention ratio at wet-heat of 30% or more, a crimp retention ratio at dry heat of 50% or more, and a rate of crimp retention ratio represented by crimp retention ratio at dry heat/crimped retention ratio at wet-heat of 1.0 or more and 1.7 or less.

The crimped polyamide yarn of the present invention preferably have a crimp retention ratio at wet-heat of 30% or more, a crimp retention ratio at dry heat of 50% or more, and a rate of crimp retention ratio represented by crimp retention ratio at dry heat/crimped retention ratio at wet-heat of 1.0 or more and 1.7 or less.

In the present invention, the crimp retention ratio at wet-heat and the crimp retention ratio at dry heat are indices of how much the crimped yarn alone can keep, in a wet-heat condition and a dry-heat condition, the crimp properties of the crimped yarn at the time of wet-heat or dry-heat treatment in purification, dyeing, and dry-heat setting in a state of a cloth (woven or knit fabric) with respect to the maximum crimp exhibited by the crimped yarn. First, in the present invention, it is preferable that the crimp retention ratio at wet-heat of the crimped polyamide yarn is set to 30% or more. If the crimp retention ratio at wet-heat is less than 30%, the crimp is too small and thus it is difficult to impart sufficient stretch to the woven or knit fabric. In addition, the crimp retention ratio at dry heat of the crimped polyamide yarn is preferably 50% or more. As with the case of the crimp retention ratio at wet-heat, the stretch is likely to be insufficient if the crimp retention ratio at dry heat is less than 50%. From this point of view, more preferable range of the crimp retention ratio at wet-heat is 40% or more and more preferable range of the crimp retention ratio at dry heat is 70% or more.

Here, as a method to simultaneously achieve the crimp retention ratio at wet-heat, the crimp retention ratio at dry heat, and the crimp retention ratio at dry heat/crimp retention ratio at wet-heat described above, a method of including 40 mass % or more of low water absorption polyamide to form a crimped yarn having high stretch elongation ratio may be used. Furthermore, examples of the method include forming a fiber structure stuck side by side and adjusting conditions by appropriately using, for example, a crimp process such as false-twisting.

Here, there have conventionally been a number of crimped yarns whose crimp is developed to a great degree by treating the crimped yarns without applying a load thereto in a state of a polyamide thread. However, it has not been successful to reproduce the processes of purification, dyeing and dry-heat setting in a state of a woven or knit fabric, and there are only a few of woven or knit polyamide fabrics, particularly materials (woven or knit fabrics) having high stretch in a warp direction of a woven fabric. This is because the tensile force (load) of the polyamide thread in a form of the woven or knit fabric and the development and sustaining behavior of crimp in wet-heat and dry heat are not taken into consideration.

In the present invention, by setting the rate of crimp retention ratio at wet-heat and dry heat small, a woven or knit fabric in which the occurrence of wrinkles is infrequent, and whose wrinkles can be removed and whose quality can be improved by performing dry-heat setting after the occurrence of wrinkles is proposed. That is, for the crimped polyamide yarn of the present invention, it is preferable that the rate of crimp retention ratio represented by crimp retention ratio at dry heat/crimped retention ratio at wet-heat described above is 1.0 or more and 1.7 or less. This rate of crimp retention ratio is preferably a value in which the crimp retention ratios at dry heat and wet-heat are close to each other. However, as described above, polyamide fibers have high form-setting properties with wet-heat treatment, and thus it is difficult to manufacture a crimped yarn whose rate of crimped retention ratio described above is less than 1.0. In addition, as the limit of the rate of crimp retention ratio, when the rate of crimp retention ratio is more than 1.7, development of crimp in the thread is also small because no improvement of quality from dry-heat setting is recognized and thus a tensile force is applied to the fabric (woven or knit fabric) in processes of purification, dyeing, and setting in order to keep the quality of the product (woven or knit fabric), and, as a result, sufficient stretch is not imparted to the woven or knit fabric.

For the present invention, from the viewpoint of crimp of the thread, an embodiment of a combination stuck side-by-side that will be described later is preferable.

The mixing ratio of the low water absorption polyamide in the side-by-side composite yarn is required to be 40 mass % or more as described above.

When the usage ratio of the low water absorption polyamide is lower than 40 mass %, the crimp development effect in the processes of purification, dyeing, and setting described above becomes smaller, or the quality of the product (woven or knit fabric) becomes degraded. In addition, although the low water absorption polyamide may be used alone for the crimped yarn, in the case where the low water absorption polyamide is expensive, the production cost can be lowered by reducing the usage ratio thereof.

Considering the cost, the mixing ratio of the low water absorption polyamide is preferably in the range of 40 mass % or more and 80 mass % or less. Moreover, considering the crimp properties, the mixing ratio of the low water absorption polyamide is 40 or more and 70 mass % or less in the case of a side-by-side type.

The fibers that include low water absorption polyamide and constitute the crimped polyamide yarn of the present invention are preferably fibers in which two kinds of polyamide different in viscosity are stuck together side by side. By employing the fiber structure of being stuck side by side, viscosity difference or contraction difference is generated between used polymers and the crimp inherent to the fibers is increased.

In addition, by disposing a low water absorption polymer on at least one side, the quality degradation in the purification or dyeing process or poor development of crimp becomes less likely to occur. Generally, a low water absorption polymer is high in cost and thus becomes very expensive when it is formed into fibers in itself. However, by employing the side-by-side fiber structure, the ratio of the expensive polymer can be reduced and thus the price of the fibers can be kept low. This can be a strong point in addition to the stretch performance.

Further, it is preferable that, in the fibers in which polymers are stuck together side by side, there is a viscosity difference of 0.03 or more and 0.15 or less between one polymer and the other polymer. If the viscosity difference is less than 0.03, the crimp development effect caused by the viscosity difference is small. If the viscosity difference is larger than 0.15, problems in product quality may arise due to the occurrence of joint malfunction between polyamide polymers or spinning malfunction.

In the crimped polyamide yarn of the present invention, by setting the initial Young's modulus in the range of 15 or more and 25 cN/dtex or less, neat texture of the woven or knit fabric is achieved while keeping soft texture. In addition, by setting the strength to 2.0 cN/dtex or more, high-order passability and product strength can be maintained.

From the viewpoint of stretch performance, product cost, spinning properties and high order passability, nylon 610 or copolymer thereof as a high-viscosity polymer and nylon 6, nylon 66, or copolymer thereof as a low-viscosity polymer are preferably employed for the combination of polyamides for fibers stuck together side by side.

Next, an example of the method for manufacturing the crimped polyamide yarn of the present invention will be described.

First, two kinds of polyamide having a viscosity difference are melt-spun through a side-by-side spinneret. In this time, the melt-spinning can be performed by using a common composite spinning machine and a common side-by-side spinneret. Spun threads are cooled to solidify, and then are wound up after an oil solution is applied thereto, preferably at a rate of 4,000 m/minute or more, to obtain a highly-oriented undrawn yarn.

In obtaining the highly-oriented undrawn yarn, winding up at a rate of 4,000 m/minute or more is preferable. If the rate of winding up is smaller than this, the threads being wound up will swell by, for example, absorbing moisture from the spinning oil solution or the air, and thus performing spinning stably will be difficult.

The crimped polyamide yarn of the present invention is obtained by performing false-twisting on the obtained highly-oriented undrawn yarn. Considering productivity and a crimp state, the range of the twist multiplier that determines the number of false-twisting is preferably 20,000 or more and 35,000 or less.

The fibers including the low water absorption polyamide used in the present invention can be obtained by selecting prescribed polymers and performing melt composite spinning with a conventionally known spinneret for single yarns or side-by-side composite yarns. The process of manufacturing therefor may be a UY/DT method which is a two-process method in which an undrawn yarn is obtained first and then the obtained undrawn yarn is drawn; an OSP method in which a drawn yarn is obtained through a single process; or POY.

It is important that the crimped polyamide yarn of the present invention including the low water absorption polyamide is a false-twisted yarn made through false-twisting. It has been conventionally known that high crimp can be imparted to a polyamide-fiber thread by performing false-twisting thereon. It is preferable that the crimped polyamide yarn is a false-twisted crimped yarn constituted by fibers including low water absorption polyamide because, by performing false-twisting on fibers including low water absorption polyamide, high crimp is developed in heat treatment from a low-temperature region, the high crimp can be maintained in the process of purification or dyeing without the quality of the woven or knit fabric being degraded, and high stretch can be imparted to the woven or knit fabric. Further, by performing false-twisting on a side-by-side crimped polyamide yarn, it becomes possible to impart large stretch to crimp and a woven or knit fabric that are larger than a crimped yarn constituted by fibers using a single low water absorption polyamide, because apparent crimp which is a fiber form before wet-heat/dry-heat treatment becomes larger and latent crimp which develops after contraction becomes higher.

Here, there are various methods of false-twisting such as pin-type, friction-type, and belt-type. However, in the present invention, pin-type is preferably used because it is preferable that synthetic fibers with fine total fineness are used. In the case of using friction, it is preferable that the false-twisting is performed while corresponding to synthetic fibers with fine total fineness by, for example, increasing the number of discs.

The processes of purification and dyeing of the woven or knit fabric at least partially including the crimped polyamide yarn are preferably performed through liquid jet processing. This is because, as described above, use of fibers including low water absorption polyamide makes quality degradation, such as wrinkles, of the woven or knit fabric less likely to occur and improves the quality degradation, such as wrinkles, due to wet-heat, in the dry-heat process as a result of low setting properties at the wet-heat process, and thus it is preferable to perform the manufacturing through liquid jet processing in which development of higher crimp is possible. In addition, also in the liquid jet processing, a method of setting a liquid jet dyeing machine, a nozzle, and a processing condition of types that apply a low tensile force to the woven or knit fabric in the processing are more preferably used. In addition, also in processes of intermediate setting and finishing setting, by using the woven or knit fabric including the crimped polyamide yarn of the present invention, heat setting can be performed on a spread fabric without excessively pulling the fabric as a result of less slackening from wet heat.

It has been conventionally possible to manufacture a woven polyamide fabric having high stretch in a weft direction because the woven fabric is processed while applying a high tensile force to the woven fabric in order to suppress quality degradation such as wrinkles. However, it has been difficult to impart high stretch to the woven fabric in a warp direction because processing is performed while applying a tensile force and thus crimp of the crimped yarn is not developed in the warp direction. With the present invention, it has become possible to manufacture a woven fabric having unconventionally high stretch by using the manner described above. Specifically, the elongation ratio of the woven fabric in the warp direction is 20% or more. In addition, the excessively large elongation ratio in the warp direction has caused reduction of high-order passability and elongation recovery ratio of the fabric and degradation of product quality, which has been especially a difficult problem with conventional methods. By using the crimped polyamide yarn of the present invention in the warp direction, it becomes possible to manufacture a woven fabric having good stretch that exhibits an elongation ratio of 20% or more with a load of 14.7 N/5 cm in the warp direction of the woven fabric and has an elongation recovery ratio of 80% or more in the warp direction of the woven fabric. It is more preferable that the elongation in the warp direction of the woven fabric is in the range of 25% or more and 40% or less while maintaining 80% or more of elongation recovery ratio. It is further preferable that the elongation ratio in the weft direction is also 20% or more.

Here, since the crimped polyamide yarn of the present invention is expected to be expensive, by using the crimped polyamide yarn for only the warp to impart high stretch in the warp direction of the woven fabric and using a conventional high crimped yarn for the weft, a woven fabric that is relatively cheap and has high stretch in both the warp and weft directions can be obtained.

In addition, products having improved wind-blocking and waterproof performance can be produced by performing lamination or coating on the stretch woven fabric obtained by using the crimped polyamide yarn of the present invention. It is preferable that the processing method of the lamination or coating is appropriately selected because the stretch of the woven fabric may reduce due to the lamination or coating. Specific examples of the processing method include selecting lamination materials or coating materials to be used, reducing the processing tensile force while checking the quality when the woven fabric is processed with a tensile force applied thereto, setting not the full-area adhesion method but the dot adhesion method as the bonding method for the lamination, and performing partial coating as the coating.

The lamination is performed by using methods such as a dry lamination method, in which a reactive adhesive is applied to one or both of a coating and a woven fabric and then dried or semidried, and the coating and the woven fabric are stuck together and compressed, and a wet lamination method, in which one or both of the coating and the woven fabric having an adhesive applied thereto are stuck together and compressed without being dried. Alternatively, the lamination may be performed by imparting reactivity to a resin coating beforehand by mixing a cross-linking agent or the like and then thermally bonding the resin coating to a woven fabric with a pressure applied thereto.

After sticking the coating and the woven fabric together, a moisture-permeable waterproof woven fabric can be obtained by releasing a releasing support body. Water-repellent treatment may be performed on the obtained moisture-permeable waterproof woven fabric as necessary by using a fluorine-based water-repellent agent, a silicone-based water-repellent agent, or the like. By performing such lamination, uses for clothing materials of, for example, outdoor wear such as clothing for fishing or mountain climbing, skiing-related wear, windbreakers, athletic wear, golf wear, rain wear, casual coats, outdoor working clothes, gloves, and shoes become possible.

For partial adhesion such as dot adhesion, it is preferable that the lamination bonding form of the woven fabric and a film is distributed partially but to the entire fabric uniformly and, specifically, a mesh pattern and a dot pattern are preferable. If the distribution of adhesive is biased, there may be portions in which dew condensation, excessive swelling of the film, or film breaking is likely to occur, and thus waterproof properties may be degraded. In addition, it is preferable that the adhesion is distributed to the entire fabric for the role of suppressing swelling from water absorption and supporting the strength.

In the case of laminating in a dot pattern, the area per dot is preferably 0.01 to 10 mm$^2$ from the aspect of performance balance. In addition, the shape of the dot is not particularly limited and all kinds of shapes such as shapes surrounded by lines, arcs, or the combination of these may be appropriately employed.

In the present invention, a reactive adhesive liquid is applied to the film or the woven fabric to be laminated by way of gravure coating, spray coating, curtain coating, or the like, in such a manner that a desired thickness and a desired application format are achieved. It is preferable that the adhesive is applied in the form of dots or lines.

Moreover, the film and the woven fabric are laminated by way of a dry lamination method in which a composite film with an adhesive applied thereto is dried or semidried and then stuck to a woven fabric with a pressure applied thereto; a wet lamination method in which a film with an adhesive applied thereto is stuck to a cloth with a pressure applied thereto without being dried; or the like. Pressing after sticking to the woven fabric is performed under appropriate conditions of temperature and pressure in such a manner that the degree of water-vapor permeability is not reduced as a result of the adhesive applied in a dot pattern or a mesh pattern being crushed.

In addition, the crimped yarn of the present invention preferably has a crimp retention ratio at wet-heat of 30% or more such that the crimped yarn is hard to reduce its crimp in wet-heat setting processes of purification, dyeing, and the like.

Further, the crimped yarn preferably has a crimp retention ratio at dry heat of 50% or more such that the crimped yarn is hard to reduce its crimp in dry-heat setting processes of intermediate setting, finishing setting, and the like.

The rate of crimped retention ratio at dry heat/crimped retention ratio at wet-heat is preferably 1.0 or more and 1.7 or less because the reduction of crimp is relatively small in a wet-heat process compared with a dry-heat process. Crimp of a typical nylon yarn is reduced more in a state of crimp being stretched with a load applied thereto in a wet-heat process compared with crimp of the typical nylon yarn developed in a state of being free from a load. Compared with this, crimp reduction of polyester in a wet-heat process with a load applied thereto is small. The effect of suppressing crimp reduction at wet-heat is also present in the woven fabric employing the crimped yarn of the present invention.

The crimped polyamide yarn of the present invention can be preferably used for clothes requiring stretch property such as sports clothes, outdoor wear, pants, and inner wear.

EXAMPLES

Next, specific description of the crimped polyamide yarn of the present invention will be given by way of examples. The values of physical properties in examples were measured by the methods below. The measurements were performed a prescribed number of times described in JIS, or five times for the measurements not described in JIS, and the average value of these were calculated.

(A) Average of Water Absorption Ratio at Temperature of 30° C. and Relative Humidity of 90% RH:

The water absorption during 24-hour treatment in an absolute dry state at a temperature of 30° C. and a relative humidity of 90% RH was measured in accordance with JIS L 0105 (version of 2006) and the water absorption ratio thereof was measured.

(B) Stretch Elongation Ratio:

The stretch elongation ratio was measured in accordance with JIS L 1013 (method C) (version of 2010). To be noted, the heat treatment was performed for 20 minutes in hot water at a temperature of 90° C. without applying a load.

(C) Crimp Retention Ratio at Wet-Heat:

The base crimp ratio is measured based on the measuring method of stretch recovery ratio shown in JIS L 1013 (version of 2010). To be noted, the treatment condition was hot water at 90° C., no load, and 20 minutes. Next, a newly obtained reel of thread is treated in hot water at a temperature of 90° C. for 20 minutes with a load of 0.0176 mN/dtex applied thereto. The crimp ratio at wet-heat is measured in the same measurement method as in the base crimp ratio, and the crimp retention ratio at wet-heat is calculated by using the following equation.

crimp retention ratio at wet-heat=crimp ratio at wet-heat/base crimp ratio×100

(D) Crimp Retention Ratio at Dry Heat:

The base crimp ratio is of the same value as in (C) described above. The obtained reel of thread is treated under dry heat at a temperature of 120° C. for 5 minutes with a load of 0.0176 mN/dtex applied thereto. The crimp ratio at dry heat is measured in the same measurement method as in the base crimp ratio, and the crimp retention ratio at dry heat is calculated by using the following equation.

crimp retention ratio at dry heat=crimp ratio at dry heat/base crimp ratio×100

(E) Rate of Crimp Retention Ratio:

The rate of retention ratio at dry heat is a value calculated by the following equation.

rate of crimp retention ratio=crimp retention ratio at dry heat/crimp retention ratio at wet-heat (F) Relative Viscosity:

An absolute dry sample in an amount of 0.25±0.001 g was dissolved in sulfuric acid of 98 mass % in such a manner that the dissolution concentration reaches 1 g/100 ml, and the relative viscosity was measured by using an Ostwald viscometer (improved Nakano type) at a constant temperature of 25±0.2° C.

(G) Strength Elongation and Initial Young's Modulus:

The measurement was performed in accordance with JIS L 1013 (version of 2010) by using AUTOGRAPH AG-IS manufactured by Shimadzu Corporation.

(H) Shrinkage in Boiling Water (Boiling Water Shrinkage Ratio):

In accordance with JIS L 1013 (version of 2010), a sample was naturally dried after being allowed to stand and then immersed in boiling water for 30 minutes, and then the shrinkage in boiling water was calculated.

(I) Elongation Ratio in Warp and Weft Directions of Fabric:

The elongation ratio of a sample of 50 mm wide and 300 mm in the warp direction and the weft direction, respectively, was measured in accordance with JIS L 1096 A method (constant rate elongation method: version of 2010) at an interval of 200 mm between grips and a pulling rate of 200 mm/minute until reaching an elongation force of 14.7 N by using a tensile tester manufactured by Instron.

(J) Elongation Recovery Ratio in Warp and Weft Directions of Fabric:

The elongation recovery ratio is measured by applying JIS L1096A method (constant rate elongation method: version of 2010). Specifically, from among samples whose temperature and humidity are adjusted to standard conditions, a sample of 50 mm wide and 300 mm long in the warp direction and the weft direction is elongated at an interval of 200 mm between grips (between original marks) and a pulling rate of 200 mm/minute until reaching 80% of the elongation ratio described above (80% when regarding the elongation ratio reached at 14.7 N of elongation force as 100%) by using the tensile tester described above and then the sample is kept for 1 minute. Subsequently, the grips are reversed to original positions at the same rate and the sample is kept for 3 minutes and then, after repeating this operation for 11 times, residual elongation (elongation at the time of being subjected to the first load of the 11th elongation after repetition of 10 cycles) is measured from a load-elongation curve that has been drawn, the elongation recovery ratio (%) is derived from the following equation, and the average value in each of the warp and weft directions is calculated to the first decimal place.

$$\text{elongation recovery ratio (\%)} = \{(L-L3)/L\} \times 100 \quad (1)$$

L is the elongation (mm) at the time of being elongated to 80% elongation, and L3 is the residual elongation (mm) of the 10-time repetition.

(K) Twist Multiplier of False-Twisting twist multiplier at the time of false-twisting
$K$=(number of twisting: $T/m$)×$\sqrt{\{(\text{fineness: }d\text{tex})\times 0.9\}}$ (L) Crimp Elongation Ratio The crimp elongation ratio was measured by using fibers of 40 cm long in accordance with JIS L 1013 (A method) (version of 2010).

With regard to yarns in a woven or knit fabric, a yarn of 40 cm long is pulled out from the woven or knit fabric and, without performing heat treatment on the pulled-out yarn,

Example 1

Nylon 6 (water absorption ratio of 7.7%) having a relative viscosity of 2.63 was used as the low-viscosity polymer and nylon 610 (water absorption ratio of 3.6%) having a relative viscosity of 2.71 was used as the high-viscosity polymer. A side-by-side composite spinneret was mounted on a common composite melt spinning machine, and melt-spinning was performed at a spinning temperature of 260° C. and in a composite ratio (mass ratio) between the low-viscosity polymer and the high-viscosity polymer of 1:1. These composite fibers were cooled and wound up at a rate of 4,000 m/minute after oil solution was applied thereto, and thereby a highly-oriented undrawn yarn having a circular section and a total fineness of 90 dtex/12 f was obtained. Subsequently, the obtained highly-oriented undrawn yarn was subjected to false-twisting by using a pin false-twisting machine at a heater temperature of 170° C. and a twist multiplier at the time of false-twisting of K=30,000, and thereby a latent crimp false-twisted yarn having a total fineness of 84 dtex/12 f was obtained.

A single woven fabric in a form of plain weave was manufactured by using the obtained latent crimp false-twisted yarn, and processes of purification and dyeing was performed byway of liquid jet purification-liquid jet dyeing. Dry-heat setting of the fabric before and after the dyeing was appropriately adjusted. The obtained product was a material having a good surface quality and very high stretch in both of the warp and weft directions. Moreover, although the obtained material could be used as a product as it is, a urethane-based two-part reactive adhesive was applied to a nonporous moisture-permeable polyurethane film in a form of dots of 1 mm in diameter by using a gravure roller. Separately, water-repellent treatment was performed on the woven fabric obtained by the method described above, and lamination was performed by laminating the polyurethane film and the woven fabric. The results are shown in Table 1.

Example 2

The highly-oriented undrawn yarn used in Example 1 was subjected to false-twisting in the same manner as in Example 1 except that the twist multiplier at the time of false-twisting was set to K=23,000, and thereby a crimped yarn of 80 dtex/12 F was obtained.

The obtained yarn was subjected to manufacturing of a gray fabric and liquid jet purification-liquid jet dyeing in the same manner as in Example 1. Dry heating of the fabric before and after the dyeing was appropriately adjusted. The obtained product was a material having a good surface quality and good stretch in both of the warp and weft directions. Lamination was performed in the same manner as in Example 1. The results are shown in Table 1.

Example 3

A highly-oriented undrawn yarn having a circular section and a total fineness of 90 dtex/12 f was obtained in the same manner as in Example 1 by using nylon 66 (water absorption ratio of 7.0%) having a relative viscosity of 2.62 as the low-viscosity polymer and nylon 610 (water absorption ratio of 3.6%) having a relative viscosity of 2.71 as the high-viscosity polymer. Subsequently, the obtained highly-oriented undrawn yarn was subjected to false-twisting by using a pin false-twisting machine at a heater temperature of 190° C. and a twist multiplier at the time of false-twisting of K=30,000, and thereby a latent crimp false-twisted yarn having a total fineness of 84 dtex/12 f was obtained.

The obtained yarn was subjected to manufacturing of a gray fabric and liquid jet purification-liquid jet dyeing in the same manner as in Example 1. Dry heating of the fabric before and after the dyeing was appropriately adjusted. The obtained product was a material having a good surface quality and high stretch in both of the warp and weft directions. Lamination was performed in the same manner as in Example 1. The results are shown in Table 1.

Example 4

A highly-oriented undrawn yarn having a circular section and a total fineness of 90 dtex/12 f was obtained in the same manner as in Example 1 by using nylon 6 (water absorption ratio of 7.7%) having a relative viscosity of 2.63 as the low-viscosity polymer and nylon 12 (water absorption ratio of 2.0%) having a relative viscosity of 3.15 as the high-viscosity polymer. Subsequently, the obtained highly-oriented undrawn yarn was subjected to false-twisting by using a pin false-twisting machine at a heater temperature of 160° C. and a twist multiplier at the time of false-twisting of K=30,000, and thereby a latent crimp false-twisted yarn having a total fineness of 84 dtex/12 f was obtained.

The obtained yarn was subjected to manufacturing of a gray fabric and liquid jet purification-liquid jet dyeing in the same manner as in Example 1. Dry heating of the fabric before and after the dyeing was appropriately adjusted. The obtained product was a material having a good surface quality and high stretch in both of the warp and weft directions. Lamination was performed in the same manner as in Example 1. The results are shown in Table 1.

Example 5

A highly-oriented undrawn yarn having a circular section and a total fineness of 90 dtex/12 f was obtained in the same manner as in Example 1 by using nylon 6 (water absorption ratio of 7.7%) having a relative viscosity of 2.63 as the low-viscosity polymer and nylon 510 (water absorption ratio of 4.1%) having a relative viscosity of 2.83 as the high-viscosity polymer. Subsequently, the obtained highly-oriented undrawn yarn was subjected to false-twisting by using a pin false-twisting machine at a heater temperature of 180° C. and a twist multiplier at the time of false-twisting of K=30,000, and thereby a latent crimp false-twisted yarn having a total fineness of 84 dtex/12 f was obtained.

The obtained yarn was subjected to manufacturing of a gray fabric and liquid jet purification-liquid jet dyeing in the same manner as in Example 1. Dry heating of the fabric before and after the dyeing was appropriately adjusted. The obtained product was a material having a good surface quality and high stretch in both of the warp and weft directions. Lamination was performed in the same manner as in Example 1. The results are shown in Table 1.

Comparative Example 1

A highly-oriented undrawn yarn of 90 dtex/12 f having a circular section and spun from the nylon 6 used in Example 1 at a rate of 4000 m/minute was subjected to false-twisted in the same manner as in Example 1, and thereby a false-twisted yarn of 78 dtex/12 F was obtained.

The obtained yarn was subjected to manufacturing of a gray fabric and liquid jet purification-liquid jet dyeing in the same manner as in Example 1, and dry heating of the fabric before and after the dyeing was appropriately adjusted. However, wrinkles and embossment were not removed by dry-heat setting and the obtained product was a material of a poor quality having wrinkles and embossment occurring therein. Lamination was performed in the same manner as in Example 1. The results are shown in Table 1.

Comparative Example 2

The same gray fabric as Comparative Example 1 was used. Although dry heating of the fabric before and after the dyeing was appropriately adjusted by using a continuous purification-liquid jet dyeing machine in an open soaper while checking the quality in terms of wrinkles and the like and the obtained product had a good quality without wrinkles, the obtained product was a material having low stretch in the warp direction. Lamination was performed in the same manner as in Example 1. The results are shown in Table 1.

Comparative Example 3

The highly-oriented undrawn yarn used in Comparative Example 1 was false-twisted in the same manner in which twist multiplier at the time of false-twisting was set to K=23,000, and thereby a false-twisted yarn of 78 dtex/12 F was obtained.

The obtained yarn was subjected to purification, dyeing, and dry-heat setting of a fabric in the same manner as in Comparative Example 2. Although the obtained product had a good quality without wrinkles or embossment, the obtained product was a material having low stretch in both of the warp and weft directions. Lamination was performed in the same manner as in Example 1. The results are shown in Table 1.

Comparative Example 4

A highly-oriented undrawn yarn of 90 dtex/12 f having a circular section and spun from the nylon 66 used in Example 5 at a rate of 4000 m/minute was false-twisted in the same manner as in Example 5, and thereby a false-twisted yarn of 78 dtex/12 F was obtained.

Although the obtained yarn was appropriately adjusted in the same manner as in Comparative Example 2 while checking the quality in terms of wrinkles and the like, the obtained product was a material having low stretch in the warp direction. Lamination was performed in the same manner as in Example 1. The results are shown in Table 1.

TABLE 1

|   |   | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Polymer 1 |  | Nylon 610 | Nylon 610 | Nylon 610 | Nylon 12 | Nylon 510 | Nylon 6 | Nylon 6 | Nylon 6 | Nylon 66 |
|  | Relative Viscosity | 2.71 | 2.71 | 2.71 | 3.15 | 2.83 | 2.63 | 2.63 | 2.63 | 2.62 |
|  | Shrinkage in Boiling Water % | 13.1 | 13.1 | 13.1 | 8.0 | 10.4 | 6.8 | 6.8 | 6.8 | 5.9 |
|  | Average of Water Absorption Ratio % | 3.6 | 3.6 | 3.6 | 2.0 | 4.1 | 7.7 | 7.7 | 7.7 | 7.0 |
| Polymer 2 |  | Nylon 6 | Nylon 6 | Nylon 66 | Nylon 6 | Nylon 6 | — | — | — | — |
|  | Relative Viscosity | 2.63 | 2.63 | 2.62 | 2.63 | 2.63 | — | — | — | — |
|  | Shrinkage in Boiling Water % | 6.8 | 6.8 | 5.9 | 6.8 | 6.8 | — | — | — | — |
|  | Average of Water Absorption Ratio % | 7.7 | 7.7 | 7.0 | 7.7 | 7.7 | — | — | — | — |
| Mixing Ratio of Low Water Absorption Polyamide % |  | 50 | 50 | 50 | 50 | 50 | 0 | 0 | 0 | 0 |
| Twist Multiplier at the Time of False-twisting K |  | 30000 | 23000 | 30000 | 30000 | 30000 | 30000 | 30000 | 23000 | 30000 |
| Stretch Elongation Ratio % |  | 197 | 141 | 188 | 117 | 176 | 132 | 132 | 85 | 144 |
| Crimp Retention Ratio at Wet-Heat % |  | 63 | 52 | 64 | 44 | 57 | 39 | 39 | 30 | 44 |
| Crimp Retention Ratio at Dry Heat % |  | 88 | 69 | 85 | 55 | 75 | 87 | 87 | 58 | 86 |
| Rate of Crimp Retention Ratio |  | 1.40 | 1.33 | 1.33 | 1.25 | 1.32 | 2.2 | 2.2 | 1.9 | 2.0 |
| Not Laminated | Warp Yarn Crimp Elongation Ratio % | 44.9 | 28.8 | 38.8 | 25.6 | 33.3 | 15.7 | 12.6 | 10.8 | 16.5 |
|  | Warp Elongation Ratio % | 41.3 | 28.1 | 35.6 | 26.7 | 31.6 | 12.5 | 10.4 | 9.1 | 14.1 |
|  | Weft Elongation Ratio % | 31.7 | 29.9 | 34.7 | 24.2 | 28.6 | 19.0 | 18.4 | 15.9 | 20.6 |
|  | Warp Elongation Recovery Rate % | 83.2 | 83.1 | 80.9 | 82.0 | 82.1 | 77.7 | 83.0 | 81.3 | 78.9 |
| Laminated | Warp Yarn Crimp Elongation Ratio % | 27.8 | 20.5 | 25.4 | 13.1 | 19.9 | 11.0 | 9.3 | 8.8 | 8.6 |
|  | Warp Elongation Ratio % | 25.3 | 18.1 | 15.2 | 11.7 | 16.6 | 9.1 | 6.4 | 4.3 | 5.1 |
|  | Weft Elongation Ratio % | 20.4 | 19.2 | 20.7 | 14.2 | 18.6 | 16.5 | 12.4 | 6.1 | 11.0 |
|  | Warp Elongation Recovery Rate % | 86.6 | 85.6 | 84.4 | 83.8 | 80.8 | 77.3 | 82.1 | 82.9 | 81.3 |

The invention claimed is:

1. A crimped polyamide yarn comprising at least 40 mass % of low water absorption polyamide having an average of water absorption ratio of 5% or less at a temperature of 30° C. and a relative humidity of 90% RH, the crimped polyamide yarn being a side-by-side composite yarn in which the low water absorption polyamide is at least one component, being false-twisted, having a crimp elongation ratio of 25% or more, and having a stretch elongation ratio of 100% or more, wherein said crimp elongation is measured by using fibers, which are pulled out from the woven or knit fabric and without performing heat treatment on the pulled-out fibers, of 40 cm long in accordance with JIS L 1013 (A method) (version of 2010).

2. The crimped polyamide yarn according to claim 1, wherein the crimped polyamide yarn at least partially includes nylon 610 or a copolymer thereof as the low water absorption polyamide.

3. The crimped polyamide yarn according to claim 2, wherein the crimped polyamide yarn has a crimp retention ratio at wet-heat of 30% or more, a crimp retention ratio at dry heat of 50% or more, and a rate of crimp retention ratio represented by crimp retention ratio at dry heat/crimp retention ratio at wet-heat of 1.0 or more and 1.7 or less.

4. The crimped polyamide yarn according to claim 2, wherein the side-by-side composite yarn is a composite yarn in which two kinds of polyamide having a viscosity difference of 0.03 or more and 0.15 or less are stuck together side by side.

5. A woven or knit fabric at least partially comprising the crimped polyamide yarn according to claim 2.

6. The crimped polyamide yarn according to claim 1, wherein the crimped polyamide yarn has a crimp retention ratio at wet-heat of 30% or more, a crimp retention ratio at dry heat of 50% or more, and a rate of crimp retention ratio represented by crimp retention ratio at dry heat/crimp retention ratio at wet-heat of 1.0 or more and 1.7 or less.

7. The crimped polyamide yarn according to claim 6, wherein the side-by-side composite yarn is a composite yarn in which two kinds of polyamide having a viscosity difference of 0.03 or more and 0.15 or less are stuck together side by side.

8. The crimped polyamide yarn according to claim 1, wherein the side-by-side composite yarn is a composite yarn in which two kinds of polyamide having a viscosity difference of 0.03 or more and 0.15 or less are stuck together side by side.

9. A woven or knit fabric at least partially comprising the crimped polyamide yarn according to claim 1.

10. The woven or knit fabric according to claim 9, wherein the woven or knit fabric is purified and dyed through liquid jet processing.

11. A woven polyamide fabric comprising the crimped polyamide yarn according to claim 1, wherein the woven polyamide fabric exhibits an elongation ratio of 20% or more with a load of 14.7 N/5 cm in a warp direction of the woven polyamide fabric, and the woven polyamide fabric has an elongation recovery ratio of 80% or more in the warp direction of the woven polyamide fabric.

12. The woven polyamide fabric according to claim 11, wherein the woven polyamide fabric is subjected to laminate processing or coating processing.

13. The woven polyamide fabric according to claim 11, wherein a side-by-side composite yarn including nylon 610 or a copolymer thereof as one component is employed as the low water absorption polyamide for at least part of the woven polyamide fabric.

14. The woven polyamide fabric according to claim 11, wherein the woven polyamide fabric has a crimp retention ratio at wet-heat of 30% or more, a crimp retention ratio at dry heat of 50% or more, and a rate of crimp retention ratio represented by crimp retention ratio at dry heat/crimp retention ratio at wet-heat of 1.0 and more and 1.7 or less.

15. The woven polyamide fabric according to claim 11, wherein the woven polyamide fabric exhibits an elongation ratio of 20% or more with a load of 14.7 N/5 cm in a weft direction of the woven polyamide fabric.

* * * * *